United States Patent
Braune et al.

(10) Patent No.: US 11,067,717 B2
(45) Date of Patent: Jul. 20, 2021

(54) OPTOELECTRONIC SENSOR AND METHOD FOR A SAFE EVALUATION OF MEASUREMENT DATA

(71) Applicant: SICK AG, Waldkirch (DE)

(72) Inventors: Ingolf Braune, Waldkirch (DE); Lars Müller, Waldkirch (DE); Matthias Neubauer, Waldkirch (DE)

(73) Assignee: SICK AG, Waldkirch (DE)

( * ) Notice: Subject to any disclaimer, the term of this patent is extended or adjusted under 35 U.S.C. 154(b) by 42 days.

(21) Appl. No.: 16/422,644

(22) Filed: May 24, 2019

(65) Prior Publication Data

US 2019/0391294 A1 Dec. 26, 2019

(30) Foreign Application Priority Data

Jun. 25, 2018 (EP) .................................. 18179639

(51) Int. Cl.
*G01V 8/10* (2006.01)
*G06T 7/73* (2017.01)
*G06T 7/593* (2017.01)

(52) U.S. Cl.
CPC ................ *G01V 8/10* (2013.01); *G06T 7/593* (2017.01); *G06T 7/74* (2017.01);
(Continued)

(58) Field of Classification Search
CPC .. G01V 8/10; G06K 9/00771; G06K 9/00973; G06K 9/03; G06K 9/629;
(Continued)

(56) References Cited

U.S. PATENT DOCUMENTS 10,089,206 B2 * 10/2018 Blocher .............. G06F 11/3024
10,263,783 B2 * 4/2019 Bohli ...................... G06F 21/64
(Continued)

FOREIGN PATENT DOCUMENTS

DE 10224031 B3 1/2004
DE 102004031678 A1 1/2006
(Continued)

OTHER PUBLICATIONS

Kumar, et al., "Real Coded Genetic Algorithm based Stereo Image Watermarking", USDIA International Journal of Secure Digital Information Age, vol. 1, No. 1, Jun. 2009.
(Continued)

*Primary Examiner* — Bobbak Safaipour
(74) *Attorney, Agent, or Firm* — Nath, Goldberg & Meyer; Jerald L. Meyer

(57) ABSTRACT

An optoelectronic sensor for detecting objects in a monitored zone is provided having at least one light receiver for generating measurement data from received light from the monitored zone and having a safe evaluation unit that has at least two processing channels for a redundant processing of the measurement data and having a comparison unit for comparing processing results of the processing channels to uncover errors in a processing channel 30a-b. The processing channels are here each configured for a determination of a signature with respect to their processing results; and the comparator unit is configured for a comparison of the signatures.

21 Claims, 4 Drawing Sheets

(52) U.S. Cl.
CPC ........... *G06T 2207/10012* (2013.01); *G06T 2207/10028* (2013.01); *G06T 2207/30232* (2013.01)

(58) Field of Classification Search
CPC . G06T 2207/10012; G06T 2207/10028; G06T 2207/30232; G06T 7/593; G06T 7/74
See application file for complete search history.

(56) References Cited

U.S. PATENT DOCUMENTS

| | | | |
|---|---|---|---|
| 2009/0204232 A1* | 8/2009 | Guru | G06Q 50/04 700/9 |
| 2019/0116001 A1* | 4/2019 | Dropps | H04L 1/0041 |
| 2019/0196926 A1* | 6/2019 | Jong | G06F 11/277 |

FOREIGN PATENT DOCUMENTS

| | | |
|---|---|---|
| DE | 102007009141 B4 | 12/2009 |
| DE | 102013214398 A1 | 1/2015 |
| EP | 2754125 B1 | 1/2017 |
| JP | 2008140386 A | 6/2019 |

OTHER PUBLICATIONS

Search Report dated Feb. 22, 2019 issued in corresponding European Application No. 18179639.2.

* cited by examiner

OPTOELECTRONIC SENSOR AND METHOD FOR A SAFE EVALUATION OF MEASUREMENT DATA

FIELD

The invention relates to an optoelectronic sensor for detecting objects in a monitored zone having at least one light receiver for generating measurement data from received light from the monitored zone and having a safe evaluation unit that has at least two processing channels for a redundant processing of the measurement data and having a comparison unit for comparing processing results of the processing channels to uncover errors in a processing channel. The invention further relates to a method for a safe evaluation of measurement data of an optoelectronic sensor, wherein the measurement data are redundantly processed in at least two processing channels and the processing results of the processing channels are compared to uncover errors.

BACKGROUND

The primary goal of safety engineering is to protect persons from hazard sources such as, for example, machines in an industrial environment represent. The machine is monitored with the aid of sensors and accordingly, if a situation is present in which a person threatens to come dangerously close to the machine, a suitable securing measure is taken.

3D sensors are inter alia used for the monitoring. They initially include 3D cameras in different technologies, for example stereoscopy, triangulation, time of flight, or evaluation of the interference of passive two-dimensional patterns or of projected illumination patterns. Such 3D sensors, in contrast to a conventional two-dimensional camera, record images that include a distance value in their pixels. These depth-resolved or three-dimensional image data are also called a depth map. Laser scanners are furthermore known that scan in two directions or in all three directions and that likewise detect three-dimensional image data over the respective scanning angles and the measured distance. The higher instrument and evaluation effort for generating three-dimensional image data in comparison with a two-dimensional image detection is justified by the additional information in a number of applications.

Sensors used in safety technology or for the protection of persons have to work particularly reliably and must therefore satisfy high safety demands, for example the standard EN ISO 13849 for safety of machinery and the machinery standard IEC61496 or EN61496 for electrosensitive protective equipment (ESPE). A number of measures have to be taken to satisfy these safety standards such as function tests, safe evaluation, or a monitoring of the contamination of optical elements.

A measure frequently used in safety engineering that is in part also required by the standards provides for a multichannel system for data processing. The channels process the data redundantly in parallel and should arrive at identical results in the processing. If this is not the case, this is as a rule due to a hardware error that is recognized in this manner. With structures having more than two channels, a majority decision (voting) is also possible.

With small data volumes, a direct comparison of data, test results, or intermediate results between the channels is possible. With large data volumes, such as in the case of images, a high effort is required for the transport of the data from one channel to the other and also for the comparison of the data, which signifies a high load on system resources. The comparison even has to take place crosswise, i.e. in each channel separately.

The safety standard IEC 61508 "Functional Safety of Electrical/Electronic/Programmable Electronic Safety-Related Systems (E/E/PE, or E/E/PES) or the standard on safety related fieldbus protocols IEC 61158, "Industrial communication networks—Fieldbus specifications—Part 1: Overview and guidance for the IEC 61158 and IEC 61784 series" introduce the term of a so-called "black channel". This is not a processing channel, but rather a communication channel for the communication from device to device. Communication over a black channel is not considered failsafe; other measures therefore have to be taken to secure the integrity of the transferred data and to uncover errors.

DE 102 24 031 B3 discloses an apparatus for monitoring a detection zone at working means. The scene is here imaged on two cameras with the aid of a beam splitter, with the cameras each having their own processing units and being coupled to one another for cross-checking. The exchange of data between the processing units for their mutual function check takes place on the plane of image features with reference to which an object can be detected and classified. Depending on how well such image features represent the complete image data, such a comparison is either incomplete and overlooks errors or so many image features have to be transferred that the complexity of the communication and of the comparison practically corresponds to a check of the entire image data.

DE 10 2004 031 678 A1 discloses a processing of monitoring data that are provided by a sensor, with the data flow between the sensor and the decision making being conducted over at least two logical processing channels. Results or intermediate results of the processing channels can be compared with one another here and there is consequently the problem with this two-channel architecture of the great effort for the comparison of large data volumes.

A monitoring of redundant components is known from DE 10 2013 214 398 A1. Profiles from an input signal are determined at two cores and the profiles are compared with one another. This is therefore a further example of a conventional two-channel structure with a comparison of the complete processing results.

In DE 10 2007 009 141 B4, test data are respectively added to the data stream in a multi-stage processing and a check is made behind the respective processing state whether these test data coincide with a desired result. A safe processing is also achieved in this manner with only one evaluation channel. The question of how large data volumes between two channels can be checked is therefore not asked at all.

SUMMARY

It is therefore an object of the invention to improve a safe, multichannel evaluation.

This object is satisfied by an optoelectronic sensor for detecting objects in a monitored zone and by a method for a safe evaluation of measurement data in accordance with the respective independent claim. A light receiver generates measurement data from received light. The measurement data are processed in an evaluation unit that is safe in the sense of the standards that are named in the introduction or that are comparable. A multichannel structure of the evaluation unit having at least two processing channels that redundantly evaluate the measurement data is provided for this purpose. A processing channel is a functional block within the evaluation unit that processes measurement data, with each processing channel being able to have, but not having to have, their own hardware modules. Errors in the processing channels are uncovered in a comparator unit by a comparison of the processing results between the channels that should coincide with an error-free function due to the redundancy. The comparator unit is likewise a functional block of the evaluation unit and is preferably redundantly provided in each processing channel for a cross-comparison.

The invention now starts from the basic idea that not all the data of the processing results have to be compared for a check of the integrity of the processing channels, but rather that a few characteristic values that represent the information are sufficient. Signatures of the processing results are therefore determined in accordance with the invention and only the signatures are compared. The signature is, however, preferably determined from the total data of the respective processing results so that a different signature results when the processing results differ at any point. It is possible that processing results are only partly safety relevant. For example, image data in a marginal region far from a hazard to be secured are possibly irrelevant. The signature can then be restricted to the safety relevant portion of the data.

The invention has the advantage that the communication and comparison effort for a mutual check of processing results is minimized by a radical data reduction. An error recognition can thus be carried out efficiently without putting unnecessary strain on system resources. The hardware and circuit effort is reduced accordingly. Functional safety and a high availability are maintained.

The sensor is preferably a camera having at least one image sensor as a light receiver that generates image data as measurement data. Although the safety concept in accordance with the invention is not restricted thereto, it above all demonstrates its advantages with large data volumes such as is typically the case with the image data of a camera. This in particular applies to a 3D camera in which data volumes and the complexity of the processing increase even further with respect to a conventional 2D camera. A 3D camera can initially use any known technology such as a time of flight principle with a direct time of flight measurement of light signals or a phase measurement or a distance estimate from brightness values or focal positions (DFF depth from focus; DFD, depth from defocus). The 3D camera particularly preferably uses a triangulation principle, however, in which two camera images of a moving camera or of a stereo camera are correlated with one another or alternatively an illumination pattern is correlated with a camera image to thus estimate disparities and to determine distances therefrom. A laser scanner also practically generates three-dimensional image data due to its periodic scanning. With a classical laser scanner, these image data are restricted to one scanning plane, but this restriction is also removed for laser scanners by a scanning moving in elevation or by a plurality of scanning beams set into elevation.

In a preferred embodiment as a stereo camera, the processing channels have at least some of the following processing stages: reading of raw images, preprocessing of raw images, generation of a depth map by a stereoscopic algorithm, generation of a detection map having relevant detected objects, determining shortest distances of the relevant objects from hazard sites, and deriving a safety related response from the shortest distances. Relevant objects are in particular those that have a minimum size or that can be considered after filtering with a body model as a body part to be detected. A complex processing flow of the original measurement data or raw images will be illustrated for the example of a stereo camera. The processing pipeline can comprise a preprocessing with smoothing, brightness adaptation, and comparable filters; the actual 3D image generation by a stereoscopic algorithm; the object recognition; the detection of safety relevant object properties; and finally the safety evaluation. Large data volume are incurred in the individual processing stages here that even exceed the volumes of the already extensive original measurement data. The check in accordance with the invention with the aid of signatures is therefore particularly advantageous.

The signature preferably has a hash value calculated from the processing results. The processing channels are in agreement on the hash function used. A hash function is very efficiently able to also calculate a hash value that represents the incoming data from large volumes of input data. This means that a different hash value results when the input data have changed at any point. The comparison of hash values therefore reliably uncovers errors. A cyclic redundancy check (CRC) is in particular used as the hash function. This can be efficiently calculated and satisfies the safety demands.

The processing channels preferably each have a plurality of processing stages and are configured to determine a signature for the processing results of said processing stage in a plurality of processing stages, in particular in all the processing stages. It appears conceivable at a first glance only to determine the signature for processing results of the last processing stage. However, this would not be safe because multiple errors in the preceding processing stages would be overlooked. This applies to a particular extent when the last processing stage only includes a comparatively simple result; in an extreme case a binary piece of information whether a safety relevant object has been detected or not. Intermediate errors are also recognized by cascading signatures.

The processing channels are preferably configured to collect signatures from different processing stages, in particular one signature for each processing stage. A kind of field of signatures is therefore produced corresponding to the number of processing stages. Not only errors and intermediate errors are thus reliably uncovered, but information is also detected which is very helpful for the diagnosis as to on which processing stage an error has occurred.

The processing channels are preferably configured to forward signatures to the next processing stage respectively. The signatures thus become part of the data flow. Alternatively, the processing channels have a signature store in which the processing stages store their respective signatures. In a mixed form, signatures are forwarded over some processing stages while other processing stages store their signatures in a signature store of the processing channel.

In a preferred embodiment, processing stages are configured to determine the signature using the processing results of the processing stage in at least one processing stage and to determine a signature from a preceding processing stage. In this embodiment, signatures are not collected or attached to one another, but instead the signature of the preceding processing stage is understood as a portion of the data and the new signature of a processing stage also represents the preceding signature as kind of meta-signature. If all the processing stages are configured in this manner, only a single signature ultimately has to be compared that ensures the integrity of the processing results of all the processing stages. However, unlike embodiments in which individual signatures of the processing stages are collected, the point at which an error first occurred is now no longer known. Mixed forms are again conceivable in which some processing stages collect their signatures and others determine a new signature while including the earlier signature or signatures.

The processing channels preferably have processing stages on different elements. The processing stages are therefore not only functional blocks on the same hardware module, but are distributed over a cascade of at least two elements, for instance an FPGA (field programmable gate array) and a microprocessor. However, it remains possible that a plurality of the processing stages are implemented on the same element and only subsequent processing stages are implemented on a different element.

The processing channels are preferably configured to forward processing results and/or signatures between the processing stages over an unsafe communication link. Such an unsafe communication link in particular means a black channel that was mentioned in the introduction. It is therefore a standard communication that does not ensure a failsafe transmission in the sense of the standards named in the introduction. The invention manages with black channels because transmission errors would equally be uncovered by the signature comparison as other errors. Communication over black channels is conventionally only used from device to device via standard interfaces. However, the advantages of a cost-efficient use of standard technologies and of a simpler hardware configuration in the interior of the device are utilized here.

The comparator unit is preferably configured only to compare signatures at the end of the processing channels. Only one central comparator unit is thereby required that only has to be present and monitored once per processing channel. Communication between the processing channels for the transfer of signatures is accordingly also only required at one point. This substantially reduces the hardware effort and evaluation effort. The signatures of the individual processing stages collected by a respective cascaded forwarding or collected centrally or the signature of the last processing stage that also represents the signatures of preceding processing stages as a kind of meta-signature are compared in dependence on the embodiment. Alternatively to a central comparison at the end of the processing channels, at least one intermediate comparison at an earlier processing stage is also conceivable.

The evaluation unit is preferably configured to forward signatures over an unsafe communication link, in particular a black channel, to the comparator unit. An embodiment has already been explained above that utilizes unsafe communication links or black channels for the data flow from processing stage to processing stage within a processing channel. A comparable concept having comparable advantages is used for communication between the processing passages here. An unsafe communication link considerably reduces the effort and transmission errors would be uncovered by additional signatures and their comparisons in the implementation of the transmission channel.

The processing channels are preferably configured to channel test data into the measurement data or processing results. Such test data are also processed in the respective processing stage and which processing result has to result with an error-free evaluation is known. Test data make it possible to test directly for specific errors in the processing and to provoke errors. An example for test data is to extend the image lines in image data or to attach image lines. Alternatively, whole test images can also be processed that are then preferably high and narrow or low and wide to nevertheless cover the total required height and width with small test images and thus small data volumes.

The processing channels are preferably configured to also determine the signature with processing results of the test data. Not all the processing results of the test data thus have to be compared, but they are rather also taken into account in the signature. A separate test data signature can in particular be determined and checked for the test data range. Which processing result the test data should deliver is known and an expected test data signature is accordingly also known.

The processing channels are preferably configured to provide data and/or signatures with an error correction option for the transmission. Accordingly, the respective next processing stage is preferably configured for the corresponding error correction, or possibly also the comparator unit for the last processing stage. Availability is increased by error correction mechanisms known per se since at least some errors are compensated. This above all relates to transmission errors in the black channels. It is as a general rule not permitted to compensate different processing results in the processing channels by error correction mechanisms because hardware errors can thereby be covered and safety relevant situations can possibly be overlooked.

The processing channels are preferably configured to delete no longer needed portions of the processing results. The signatures include all the information relevant to a comparison so that intermediate results no longer required for the actual evaluation are also no longer required for the final comparison between the channels. This would be different with a conventional two channel structure because then errors could be overlooked that were compensated by chance in the final result.

The evaluation unit preferably has more than two processing channels and the comparator unit is configured for a voting procedure for the evaluation of signatures. Safety and/or availability can be increased by multiple redundancy. It is preferably not required that all the processing channels deliver identical signatures even though this strict demand would be conceivable. It is rather determined by voting with reference to a comparison whether at least a sufficient majority of the processing channels carry out coinciding evaluations.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
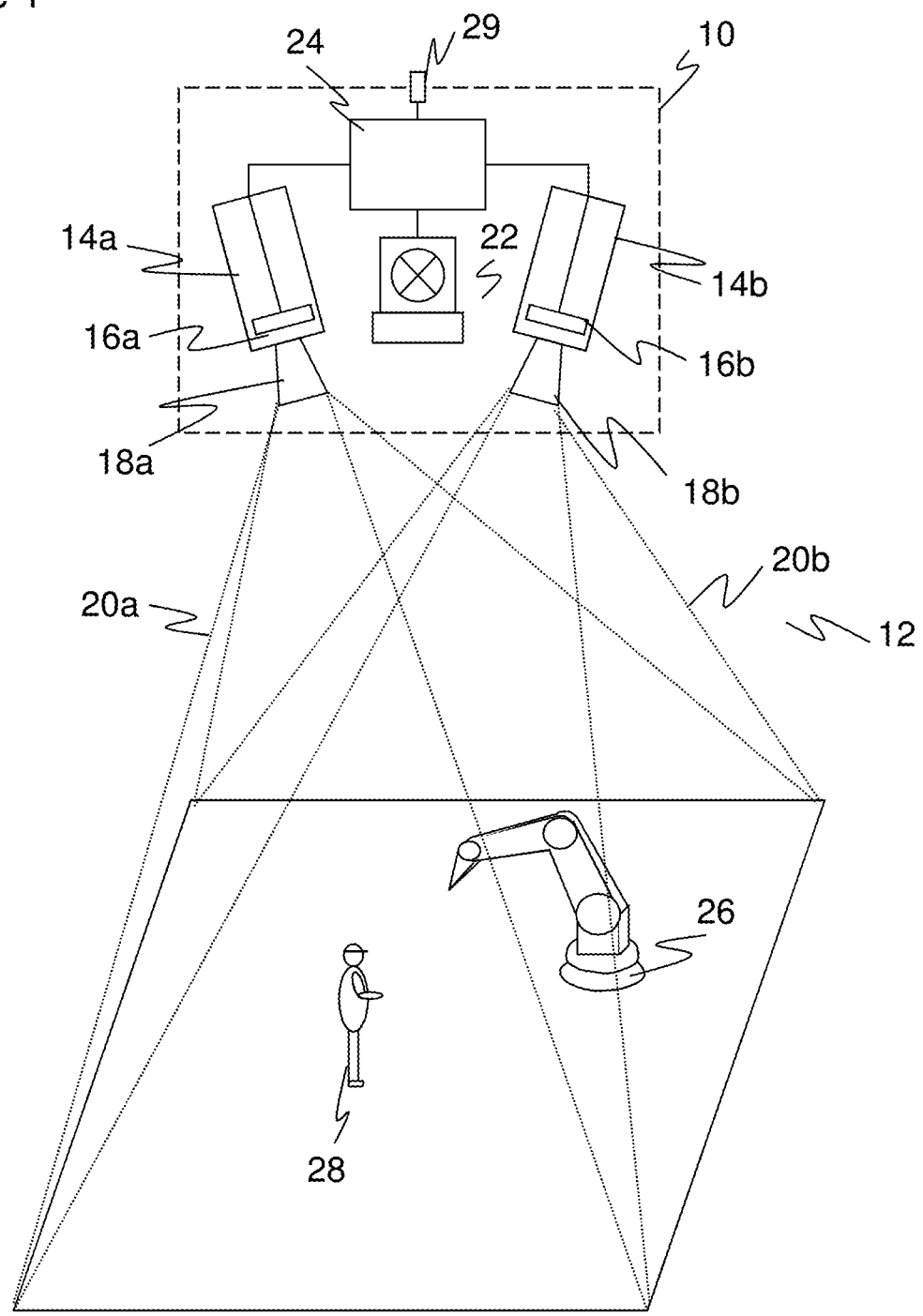
FIG. 1 a schematic three-dimensional representation of a 3D camera and its the monitored zone.

FIG. 1 shows the general design of a stereo camera 10 for recording a depth map in a schematic three-dimensional representation. The stereo camera 10 serves only as an example for a sensor in accordance with the invention that as a rule generates particularly large data volumes and therefore illustrates the advantages of the invention to a particular degree. Other optoelectronic sensors, inter alia the other 3D cameras named in the introduction, would equally be conceivable with a determination of the time of flight or an evaluation of the interference of passive two-dimensional patterns or with a correlation of image and projected illumination patterns and laser scanners.

To detect a spatial zone 12, two camera modules 14*a*, 14*b* are mounted at a known fixed distance from one another and each take images of the spatial zone 12. An image sensor 16*a*, 16*b*, usually a matrix-type imaging chip, is provided in each camera and records a rectangular pixel image, for example a CCD or a CMOS sensor. One objective 18*a*, 18*b* having an optics which in practice can be realized as any known imaging lens is associated with each of the image sensors 16*a*, 16*b*. The maximum angle of view of these optics is shown in FIG. 1 by dashed lines which each form a pyramid of view 20*a*, 20*b*.

An illumination unit 22 is provided between the two image sensors 16*a*, 16*b* to illuminate the spatial zone 12 with a structured pattern. The stereo camera shown is accordingly configured for active stereoscopy in which the pattern also imparts evaluable contrasts everywhere to scenery that is structure-less per se. Alternatively, no illumination or a homogeneous illumination is provided to evaluate the natural object structures in the spatial one 12, which as a rule, however, results in additional aberrations.

An evaluation and control unit 24 is connected to the two image sensors 16*a*, 16*b* and to the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that can be distributed as desired over internal and external components, with external components also being able to be integrated via a network or cloud provided that latencies can be managed or tolerated. Since the generation of the depth map and its evaluation are very computing intensive, an at least partly parallel architecture is preferably formed.

The control and evaluation unit 24 generates the structured illumination pattern with the aid of the illumination unit 22 and receives image data of the image sensors 16*a*, 16*b*. It calculates the 3D image data or the depth map of the spatial zone 12 from these image data with the aid of a stereoscopic disparity estimate. The total detectable spatial zone 12 or also the working region can be restricted via a configuration, for example to mask interfering or unnecessary regions.

An important safety engineering application of the stereo camera 10 is the monitoring of a machine 26 that is symbolized by a robot in FIG. 1. The machine 26 can also be substantially more complex than shown, can consist of a number of parts, or can actually be an arrangement of a plurality of machines, for instance of a plurality of robots or robot arms. The control and evaluation unit 24 checks where an object 28, shown as a person, is located with respect to the machine 26. A smallest distance of an object 28 from the machine 26 is output via a safe interface 29, either directly to the machine 26 or to an intermediate station such as a safe control. The stereo camera 10 is preferably in total failsafe in the sense of safety standards such as those named in the introduction. The evaluation in the control and evaluation unit 24 is safe due to a special multichannel structure that will be explained in more detail below with reference to FIGS. 3 to 7.

A control connected to the safe interface 29, either a higher ranking control or that of the machine 26, evaluates the shortest distance. In the hazard case, a safety related response is initiated in order, for example, to stop or brake the machine 26 or to cause it to evade. Whether this is necessary can, in addition to the shortest distance, depend on further conditions such as the speeds or the nature of the object 28 and the machine zone 26 of the impending collision. The safety evaluation can alternatively take place in the control and evaluation unit 24 and can also be based on different criteria than a shortest distance.

A distance monitoring will be described in somewhat more detail, but only as representative, for a human-robot collaboration while taking account of DIN EN ISO 10218 and/or ISO/TS 15066. The starting point is formed by the positions of the machine parts of the machine 26, at least to the extent that they are safety relevant, or by hazard sites defined on this basis and optionally expanded with reference to response and stopping times or other criteria and by the objects 28 detected by the stereo camera 10. The latter is, for example, present in the form of a 2D detection map, its pixels at positions in which an object 28 of a minimum size was detected, the distance value measured for this purpose is entered and otherwise remains empty. The respective distance, and in particular the shortest distance, from the machine 26, that forms a hazard site that is preferably also dynamic is calculated with the aid of these object detections that can naturally also be differently represented. Depending on the distance, a securing then takes place, optionally by a control connected to the safe interface 29, that can, as mentioned multiple times, also comprise an evasion or a slowing down.

Figure 2:
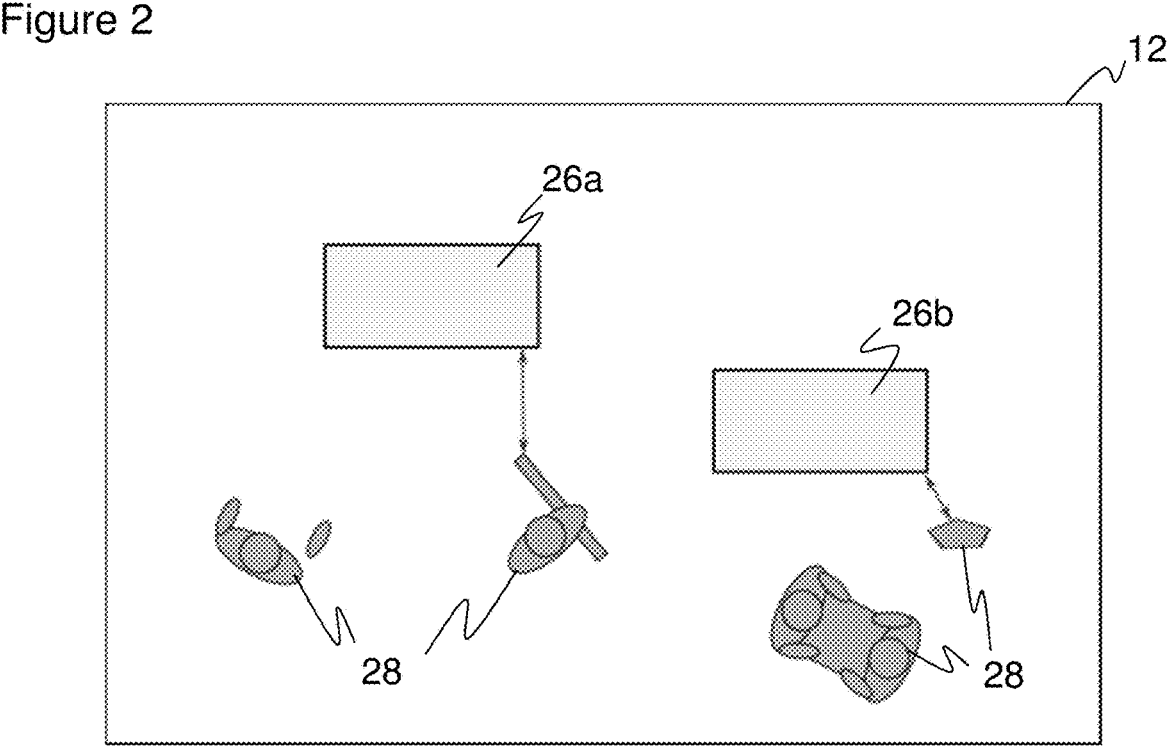
FIG. 2 an exemplary monitoring situation with a plurality of hazard sites and objects.

FIG. 2 shows an exemplary monitoring situation in the monitored zone 12. The securing task on the basis of the stereo camera 10 then comprises recognizing the presence of persons, here simply defined as objects 28 of a specific minimum size, and initiating a defined response in a safety related manner in dependence on their position and optionally on further parameters and the current machine status so that the safety of the humans is ensured at all times.

In this example, two hazard sites 26*a*-*b* have to be monitored, that is machine regions or machines, and four objects 28 are currently recognized in their environment by the stereo camera 10. The stereo camera 10 delivers distance data so that a connected control protects the persons from injury by a reduced speed, an evasive replanning of the routines, or where necessary a stop of the machines in the hazard areas 26*a*-*b* in good time.

A hazard site 26*a*-*b* is a preferred modeling of the hazardous machine 26. The hazard site 26*a*-*b* is a spatial zone in which the machine 26 carries out work movements in a respective time period. The hazard site 26*a*-*b* can surround the machine 26 or partial regions of the machine with a little spacing to leave sufficient clearance for the work movements. In addition, it is advantageous for the calculations to define geometrically simple hazard areas 26a-b such as parallelepipeds or spheres, for which purpose certain empty spaces can then be accepted. A plurality of hazard sites 26a-b surround a plurality of machines 26 and/or a plurality of moving part sections of a machine 26. Hazard sites 26a-b can be rigid and can comprise all conceivable work movements. Alternatively, respective hazard sites 26a-b are defined for part sections of the work movement that are utilized in a sequence corresponding to the process and that are smaller and are better adapted.

The control and evaluation unit 24 continuously calculates the shortest distance of the object 28 closes to a respective hazard site 26a-b. Arrows are drawn in FIG. 2 that in the current situation of FIG. 2 represent the two shortest distances with respect to the two hazard sites 26a-b. The shortest distance connects the closest point of a hazard site 26a-b to the nearest point of the next object 28. It is assumed in this representation that the small object 28 at the bottom right exceeds the minimum size. It would otherwise be ignored and instead the distance from the two merged persons who form the second-closest object 28 would be output.

The respective shortest distance last determined with respect to a hazard site 26a-b is provided cyclically or acyclically at the safe interface 29. Typical output rates are multiple times a second; however, a more infrequent updating is also conceivable depending on the required and possible response time of the stereo camera 10. A higher ranking control connected to the safe interface 29, in particular that of the machine 26, plans the next workstep again, where necessary in dependence on the shortest distance, so that the required safety distance between human and machine is always maintained.

The control and evaluation unit 24 preferably also determines a speed of the object 28 from which the shortest distance was measured and outputs it with the shortest distance to the safe interface 29. The hazard can thus be differentiated even better. The closest object 28 is admittedly the most dangerous as a rule—or in more precise terms the one most at risk. The safety distance that the machine 26 maintains on its movement planning can additionally be adapted to a maximum speed of a human movement. The safety related response of the machine is nevertheless best adapted to its environment if more information is present on the closest object 28 and possibly also on further objects 28. A dependence on the machine's own status and on the planned movement of the machine 26, in particular the position and speed of machine parts or even of dangerous tool regions, is also conceivable, with such information preferably being provided by the machine control.

There are a number of further measurement parameters or of parameters derived therefrom that the control and evaluation unit 24 can output, in addition to the shortest distance, to the safe interface 29 so that they can enter into the safety observation of the control connected there. The speed of the closest object 28 from which the shortest distance is measured has already been discussed. Additional shortest distances from further objects 28 or from separate object sections of the closest object 28, for example of a different arm, are preferably output. A possible criterion here would be that there are even further local distance minima in the same object since the direct adjacent points from the shortest distance are of no interest. For example, the stereo camera 10 guarantees the monitoring of the five closest distances per active hazard site 26a-b. A sixth object and further objects or object sections are no longer considered, with an additional piece of information being conceivable, however, that there are more than five objects of the minimum size in the monitored zone 12. The connected control can thus also pre-plan for further future danger situations with other objects 28 than the closest object 28. A plastic example is a still somewhat more remote object 28 that approaches a hazard site 26a-b at high speed.

Further conceivable additional pieces of information are, non-exclusively, the size of the next object 28, its position in the form of a focus or of the closest point, a direction of movement, an object envelope, an enveloping body surrounding the object 28, or a representation of the object 28 in total as an object cloud, 3D point cloud, or 3D voxel representation.

Figure 3:
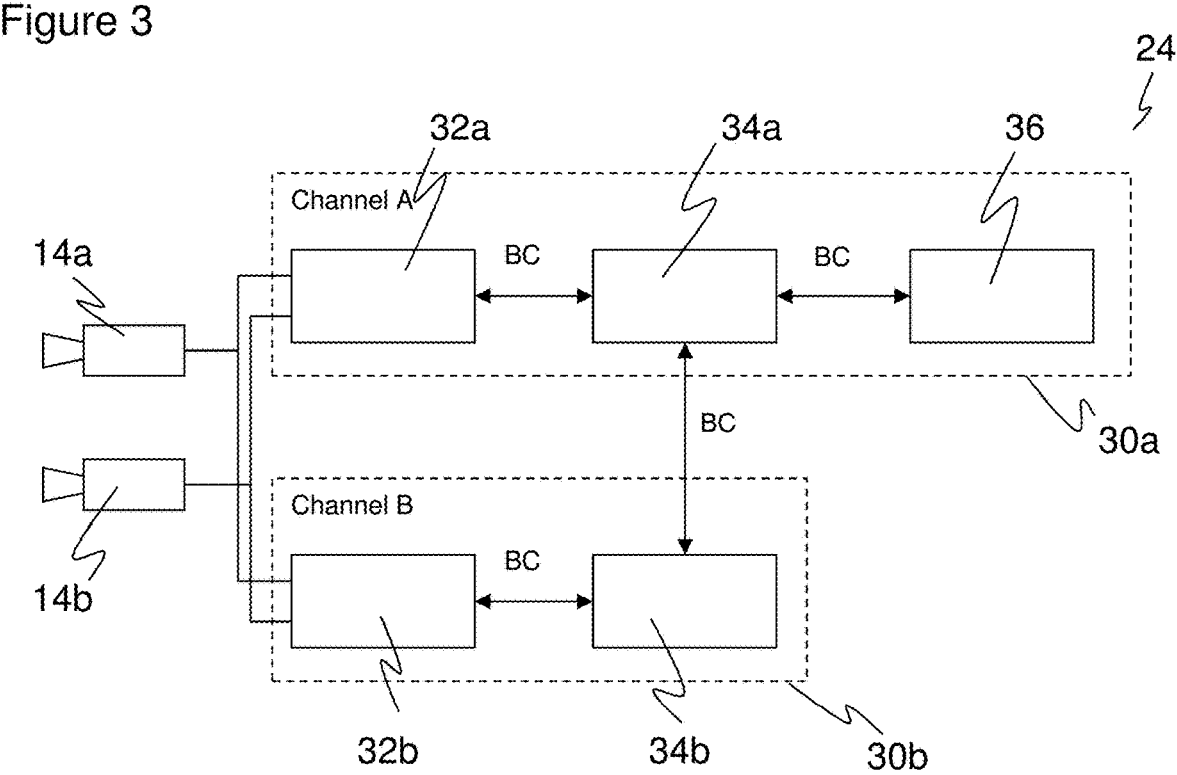
FIG. 3 a schematic representation of a two channel evaluation unit.

FIG. 3 shows a schematic representation of the control and evaluation unit 24 in an embodiment having two processing channels 30a-b. The actual measurement data of the stereo camera 10 and thus the starting size are the raw image of the two camera modules 14a-b. Each processing channel 30a-b has a plurality of processing stages. However, FIG. 3 does not show the actual processing stages that are only introduced in FIG. 4, but rather the hardware structure with a respective two modules connected after one another, for instance a respective FPGA 32a-b and a respective multicore processor 34a-b. Differently, there can be only one such module or more modules and one or more processing stages can be implemented on each module. Communication to the outside takes place via a communication processor 36 that is not redundantly provided here and whose securing is not further discussed because it is no longer part of the actual evaluation.

The image sensors 16a-b of the two camera modules 14a-b deliver two images at a frame repetition rate of, for example, fifty frames per second with a resolution that is typically in the order of magnitude of megapixels. These images are offset to form a depth map from which then detection maps and other characteristic value maps can be generated. The anyway high data volume thus increases even further in the first processing steps. A complete comparison of the processing results between the processing channels 30a-b on the individual processing stages would therefore be extremely complex and/or expensive. However, an error-free or error-recognizing processing must be guaranteed and if necessary a safety related response has to be triggered. Only signatures are therefore compared in accordance with the invention that are directly introduced with reference to FIG. 4.

However, a further advantageous aspect of the invention should still be explained from FIG. 3. Two kinds of communication are necessary in the two channel evaluation unit 24, namely within the processing channels 30a-b for forwarding data between the processing stages also beyond elements 32a-b, 34a-b, and also between the processing channels 30a-b for the comparison of processing results or signatures. This communication preferably takes place over unsafe communication paths, in particular black channels, and the communication paths are drawn by arrows correspondingly marked by BC in FIG. 3. Black channels were introduced in the introduction; the communication is accordingly implemented cost-efficiently and hardware-efficiently without safety technology and the securing of the data takes place via signatures and functional monitoring.

Figure 4:
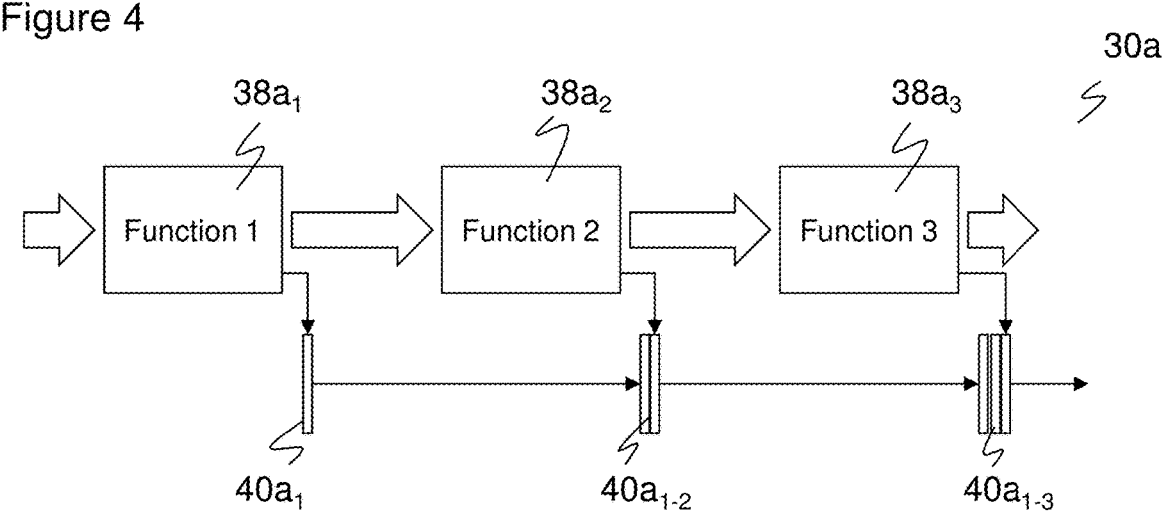
FIG. 4 a schematic representation of a multistage processing channel with a generation of cascaded signatures.

FIG. 4 shows by way of example only one of the processing channels 30a to now illustrate the multistage structure on the plane of processing stages $38a_{1-3}$. The processing stages $38a_{1-3}$ can be implemented on a plurality of elements as was described with reference to FIG. 3. The processing stages $38a_{1-3}$, whose shown number of three is naturally purely by way of example, can in principle carry out any desired evaluations of the measurement data.

As a specific example, the stereo camera 10 with distance monitoring in accordance with FIGS. 1 and 2 should again be made use of as a representative and a conceivable processing pipeline for it should be described. A stereo camera 10 could also be evaluated differently and the multichannel structure in accordance with the invention is also suitable for different detection principles and sensors.

The camera modules 14a-b of the stereo camera 10 initially generate raw images. They are preprocessed in a first processing stage to compensate smaller interference points, brightness differences, and similar or to carry out a geometry correction. A depth map is then generated from the raw images in a further processing stage by means of a stereo algorithm. Relevant objects are then detected in the depth map. This can per se require a plurality of processing stages, for instance to mask hazard sites 26a-b that are not themselves monitored to exclude background objects or to ignore small interference objects and defects in which no depth values can be detected. Conditions can also be made on the detected objects such as a minimum size or a coincidence with a body model. In a further processing stage, the shortest distance from the next object 28 is then determined for every hazard site 26a-b. This can be the sought output size for the safe interface 29 and thus the last processing stage. Alternatively, the evaluation of the shortest distances represents a further processing stage that results in a safety related response or an unimpeded continuance of the worksteps of the machine 26.

After this specific example, the processing stages $38a_{1-3}$ will from now on be looked at in the abstract. The respective processing result of a processing stage $38a_{1-3}$ is, on the one hand, passed on to the next processing stage. In addition, a signature $40a_{1-3}$ is determined from the processing results that serves to uncover errors in the processing channels 30a-b.

This signature $40a_{1-3}$ for the representation of the information of the processing results can be a hash value of a previously fixed hash function of the data to be compared. In addition, aggregated intermediate values of the data processing can serve as part of the signature $40a_{1-3}$, for instance a hash value for a detected object 28 having features such as its size and position. Finally, results of internal tests are also conceivable that are later compared with an expectation, with either the test results themselves or a signature thereof being stored as a part of the signatures $40a_{1-3}$.

The signatures $40a_{1-3}$ aggregate relevant information in very small data blocks and thus enable an efficient comparison of the data between the two redundant processing channels 30a-b. The signature $40a_{1-3}$ is preferably generated over all the respective generated data of the processing results of the processing stage $38a_{1-3}$ so that a change somewhere in the data is reflected in a change of the signature $40a_{1-3}$. An advantageous hash function for determining signatures is a CRC (cyclic redundancy check) process. This can be efficiently calculated and has all the required properties.

The signatures $40a_{1-3}$ can, as shown in FIG. 4, be passed on in the data flow to the next processing stage $38a_{1-3}$ and can increase in so doing. Each processing stage $38a_{1-3}$ here adds its signature $40a_{1-3}$.

Figure 5:
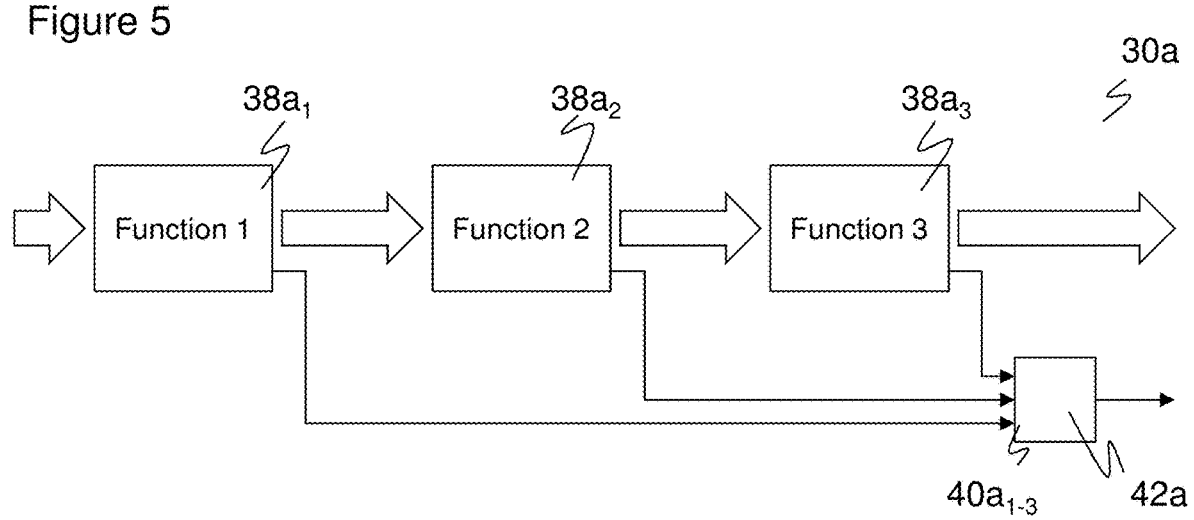
FIG. 5 a schematic representation of a multistage processing channel similar to FIG. 4 in which, however, the signatures of the processing stages are centrally collected.

FIG. 5 shows an alternative in which the signatures $40a_{1-3}$ are centrally collected in a signature store 42a. They are then transferred together at the end of the last processing stage $38a_{1-3}$. Mixed forms are conceivable in which signatures $40a_{1-3}$ are passed on in part as in FIG. 4 and are stored centrally in a signature store 42a in at least one processing stage $38a_{1-3}$ as in FIG. 5.

In all these cases, the procedure facilitates the error identification since the deviations of the signatures in the processing channels start at a specific defective processing stage $38a_{1-3}$. Differing from the representations of FIGS. 4 and 5, it is also conceivable not to keep any individual signatures $40a_{1-3}$, i.e. neither in growing form nor centrally stored. Instead, each processing stage $38a_{1-3}$ generates a respective signature into which the signature of the preceding processing stage $38a_{1-3}$ also enters in addition to the processing results of its own processing stage $38a_{1-3}$. Such a signature therefore also represents the previous signatures as a kind of nested meta-signature. At the end, only a single signature thus has to be compared; however, at the price that an error is only uncovered, but cannot be associated with a specific processing stage $38a_{1-3}$.

FIG. 6 again schematically shows an embodiment of a safe two channel control and evaluation unit 24, with the two processing channels 30a-b being on a functional plane with processing stages $38a$-$b_{1-3}$ as shown in FIG. 4, and not as a hardware structure as in FIG. 3. The number of processing stages $38a$-$b_{1-3}$ is furthermore purely exemplary and the structure in accordance with FIG. 5 could alternatively also be selected for the individual processing channels 30a-b.

Figure 6:
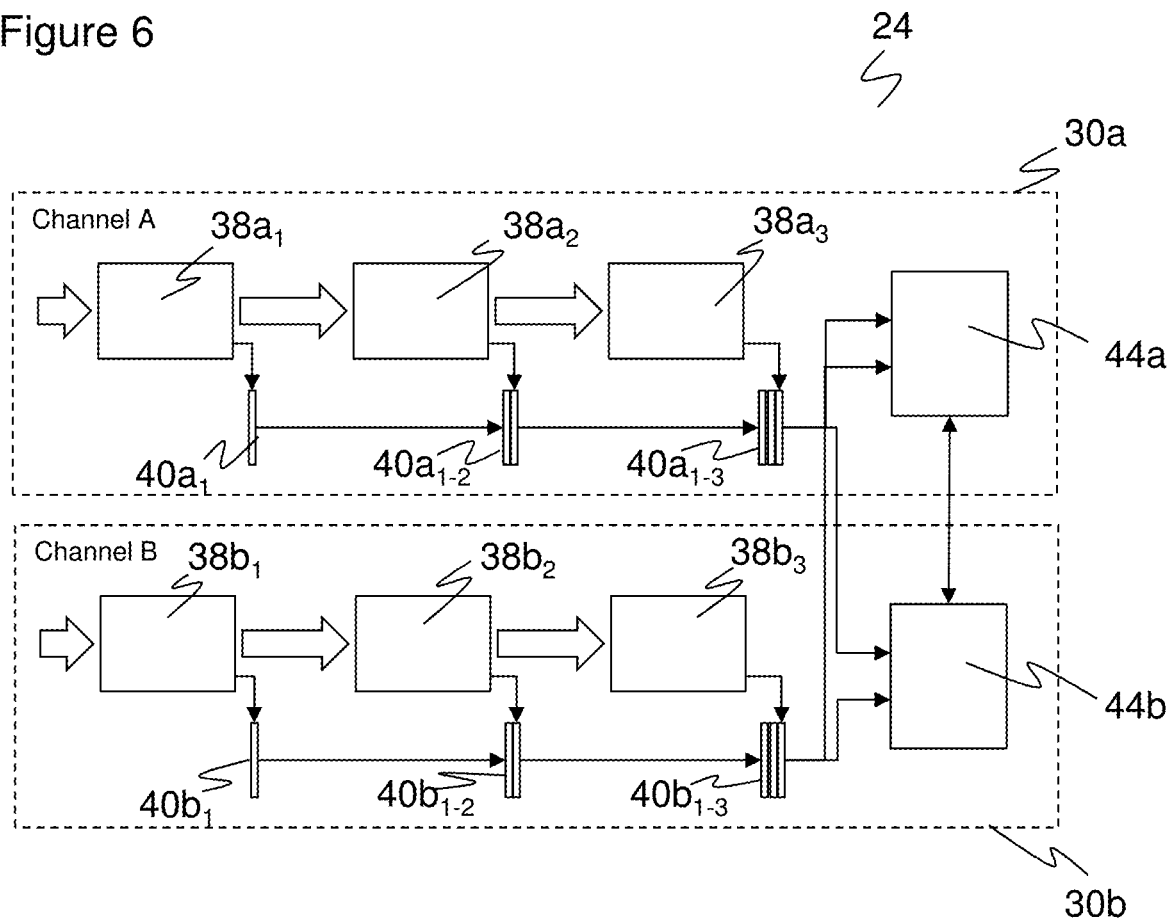
FIG. 6 a schematic representation of a two channel evaluation unit with multistage processing channels and a one-time comparison at the end of the processing.
Figure 7A:
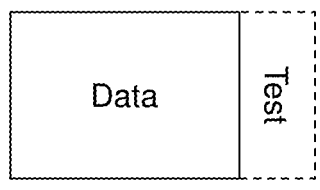
FIGS. 7*a*-*b* schematic representations of the attachment of test data by extending image lines or attaching image lines.
Figure 7B:
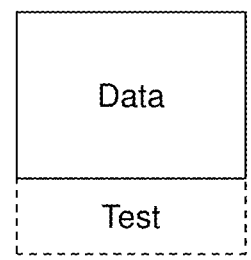

As can be recognized in FIG. 6 and also already in FIG. 2, only the last aggregated signatures $40a$-$b_{1-3}$ of the last processing stages $38a$-$b_3$ are preferably compared. An intermediate comparison in other processing stages $38a$-$b_{1-2}$ would be generally conceivable, but means an additional effort that is not at all necessary because the comparison at the end can also localize the error.

The signatures $40a$-$b_{1-3}$ carried along with the data flow or alternatively the centrally collected signatures $40a$-$b_{1-3}$ are compared crosswise at the end of the processing chain in a respective comparator unit 44a-b of the processing channels 30a-b. The cross-communication and the comparison effort are thereby even doubly substantially reduced, namely because only signatures $40a$-$b_{1-3}$ are compared, on the one hand, and this is done only once at a central point, on the other hand. This approach also has the advantage that data no longer required within the processing chain can be deleted since the information required for the comparison is stored in the signatures $40a$-$b_{1-3}$.

FIG. 6 is simplified in the respect that the forwarding of the processing results of the last processing stage $38a$-$b_{1-3}$ is not shown. An arrow from the last processing stage $38a$-$b_{1-3}$ to the communication processor 36 would therefore have to be added notionally. For this purpose, data from any desired one of the two processing channels 30a-b can be used of which it has been separately demonstrated that they coincide.

In addition to the determination of signatures $40a$-$b_{1-3}$ for the respective processing results of the processing stages $38a$-$b_{1-3}$, functional tests are also conceivable with specific stimulations to directly check specific aspects of the processing. Such test data can extend the data lines as in FIG. 7a or additional test lines are attached to the data lines as in FIG. 7b. Alternatively, whole test data sets can be inserted into gaps between the functional data sets. They then take up their own test time windows, but this has the advantage that the test coverage can be increased. For example, high and narrow or low and wide images can be applied that together in total efficiently and effectively test the processing over the total image extent.

The processing results of test data can preferably likewise enter into the signature $40a\text{-}b_{1\text{-}3}$ of the processing stage $38a\text{-}b_{1\text{-}3}$ or can alternatively be compared with the expectation within the processing stage $38a\text{-}b_{1\text{-}3}$. A central comparison at the end of the processing channels $30a\text{-}b$ is preferred since this requires the least additional effort. No local comparator units thus have to be provided and the comparator unit $44a\text{-}b$ at the end of the processing channels $30a\text{-}b$ is anyway adapted for signature comparisons and where required is safe in itself by function tests.

As explained for different embodiments, an aspect of the invention is the utilization of signatures $40a\text{-}b_{1\text{-}3}$ for a resource-saving error discovery. It is an advantageous additional aspect to carry out the comparison only once in a central comparator unit $44a\text{-}b$ at the end of the processing channels $30a\text{-}b$. As a further advantageous aspect, the communication takes place in an non-safe manner, in particular by means of black channels, both within the processing channels $30a\text{-}b$ and between processing channels $30a\text{-}b$. The safety protocol achieves a security against transmission errors such as repetition, loss, insertion, incorrect order, delay, or defective data transmission. The data integrity is safe, for example, via continuous numbers of the data packets, a time monitoring, and data CRCs. In the event of an error, the just-named transmission errors can be recognized. In addition defective data packets can be corrected by the additional use of an error-correcting encoding of the transmission secured by a black channel in the standard channel, whereby system availability is increased.

The invention has been described for embodiments having two processing channels $30a\text{-}b$. A multichannel structure is also conceivable having at least one additional processing channel that then has the same design per se as one of the two processing channels $30a\text{-}b$. A majority decision (voting) then preferably takes the place of a simple comparison with the assumption of an error in the case of non-coincidence, with the required majority being a means to weigh the safety level and the availability with respect to one another. If, for example, unanimous voting is required, the additional processing channel only increases the safety, while the likelihood that an error occurs in a processing channel increases at the costs of availability. A 2:1 majority that tolerates a deviation in a processing channel at higher availability may still be considered very safe because it is extremely unlikely that the same error occurs in two processing channels at the same time.

Alternatively to a comparison of signatures $40a\text{-}b_{1\text{-}3}$, a direct comparison of the data or of specific higher value features such as detected objects or test decisions would also be possible. A safe evaluation then also becomes possible, but the advantages of simple, resource-saving comparisons are lost. It is further conceivable not to compare all the data, but rather to reach the data volume by omitting some of the data. However, this brings about a smaller error discovery and is thus disadvantageous for the functional safety of the system.

The invention claimed is:

1. An optoelectronic sensor for detecting objects in a monitored zone, the optoelectronic sensor having
    at least one light receiver for generating measurement data from received light from the monitored zone;
    a safe evaluation unit that has at least two processing channels for a redundant processing of the measurement data; and
    a comparison unit for comparing processing results of the processing channels to uncover errors in a processing channel,
    wherein the processing channels are each configured for a determination of a signature with respect to their processing results; and wherein the comparison unit is configured for a comparison of the signatures, the signature obtained by aggregating at least a subset of safety-relevant data in small data blocks,
    wherein a change in the safety-relevant data renders a change of the signature, and wherein the processing channels each have a plurality of processing stages and are configured to determine a signature in a plurality of processing stages for the processing results of said processing stage.

2. The sensor in accordance with claim 1,
    wherein the sensor is a camera having at least one image sensor as the light receiver that generates image data as measurement data.

3. The sensor in accordance with claim 2,
    in which camera the processing channels have at least some of the following processing stages: reading of raw images, preprocessing of raw images, generation of a depth map by a stereoscopic algorithm, generation of a detection map having relevant detected objects, determining shortest distances of the relevant objects from hazard sites, and deriving a safety related response from the shortest distances.

4. The sensor in accordance with claim 2,
    wherein the camera is a stereo camera.

5. The sensor in accordance with claim 1,
    wherein the signature has a hash value calculated from the processing results.

6. The sensor in accordance with claim 5,
    wherein a cyclic redundancy test is used as the hash function.

7. The sensor in accordance with claim 1,
    wherein the processing channels each have a plurality of processing stages and are configured to determine a signature in all the processing stages for the processing results of said processing stage.

8. The sensor in accordance with claim 1,
    wherein processing channels are configured to collect signatures from different processing stages.

9. The sensor in accordance with claim 8,
    wherein signatures are each forwarded to the next processing stage.

10. The sensor in accordance claim 1,
    wherein the processing channels have a signature store in which the processing stages store their respective signatures.

11. The sensor in accordance with claim 1,
    wherein the processing channels are configured to determine the signature in at least one processing stage via the processing results of the processing stage and to determine a signature from a preceding processing stage.

12. The sensor in accordance claim 1,
    wherein the processing channels have processing stages on different elements.

13. The sensor in accordance with claim 1,
    wherein the processing channels are configured to forward processing results and/or signatures between processing stages over an unsafe communication link.

14. The sensor in accordance with claim 1,
    wherein the comparison unit is configured only to compare signatures at the end of the processing channels.

15. The sensor in accordance with claim 1,
wherein the safe evaluation unit is configured to forward signatures to the comparison unit via an unsafe communication link.

16. The sensor in accordance with claim 1,
wherein the processing channels are configured to channel test data into the measurement data or processing results.

17. The sensor in accordance with claim 16,
wherein the processing channels are also configured to determine the signature via processing results of the test data.

18. The sensor in accordance with claim 1,
wherein the processing channels are configured to provide data and/or signatures with an error correction option for the transmission.

19. The sensor in accordance with claim 1,
wherein the processing channels are configured to delete no longer required portions of the processing results.

20. The sensor in accordance with claim 1,
wherein the safe evaluation unit has more than two processing channels and the comparison unit is configured for a voting process for evaluating signatures.

21. A method for a safe evaluation of measurement data of an optoelectronic sensor,
wherein the measurement data are redundantly processed in at least two processing channels and the processing results of the processing channels are compared to uncover errors,
wherein, in the processing channels, a respective signature of their processing results is determined and only the signatures are compared, the signature obtained by aggregating at least a subset of safety-relevant data in small data blocks,
wherein a change in the safety-relevant data renders a change of the signature, and wherein the processing channels each have a plurality of processing stages and are configured to determine a signature in a plurality of processing stages for the processing results of said processing stage.

* * * * *